Feb. 10, 1931.    E. F. BACON    1,791,786
ELECTRICAL INDICATING INSTRUMENT
Filed March 13, 1929
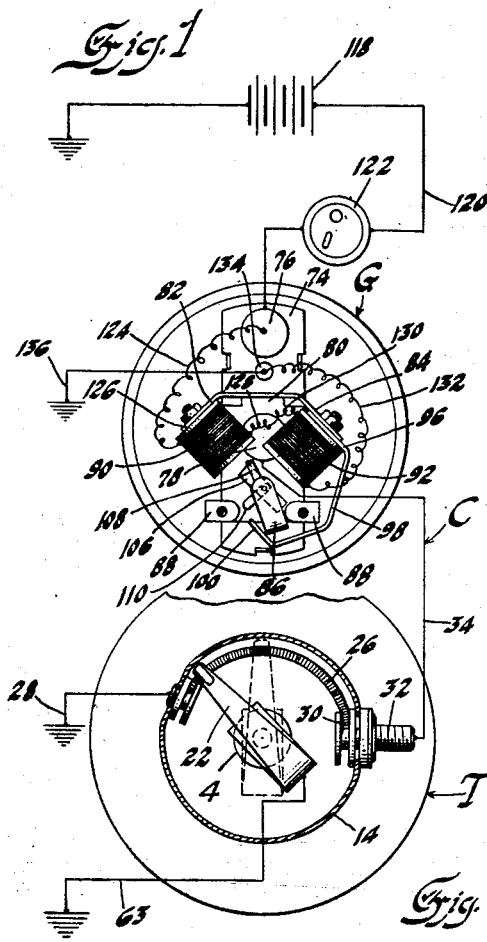
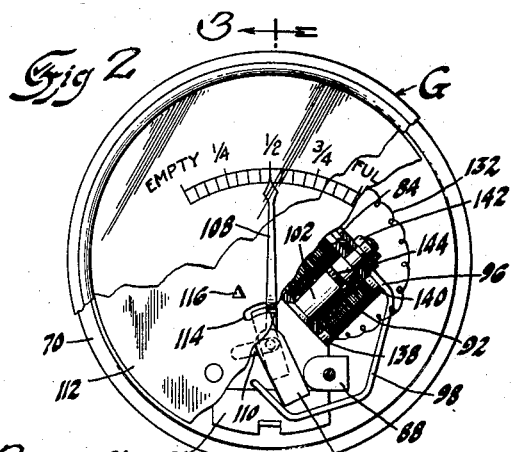
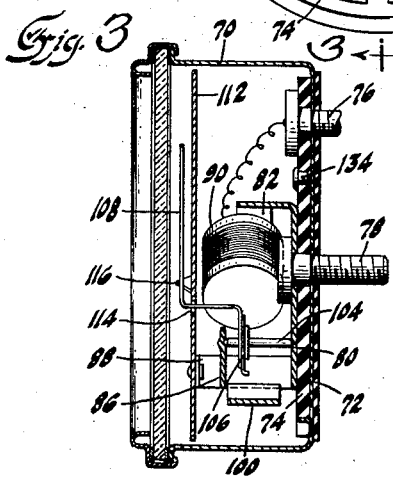
Inventor
Elbridge F. Bacon
By Blackmore, Spencer & Flint
Attorneys Patented Feb. 10, 1931

1,791,786

UNITED STATES PATENT OFFICE

ELBRIDGE F. BACON, OF FLINT, MICHIGAN, ASSIGNOR TO A C SPARK PLUG COMPANY, OF FLINT, MICHIGAN, A COMPANY OF MICHIGAN

ELECTRICAL INDICATING INSTRUMENT

Application filed March 13, 1929. Serial No. 346,634.

This invention relates to liquid level indicators and has particular reference to an indicator of the electrical type which will show to the driver of an automotive vehicle the level or amount of liquid in the gasoline tank, although the invention is applicable to liquid level apparatus where it is desired to read the liquid level on a gage located at a distance from the receptacle.

In prior devices of the type disclosed in the application use has invariably been made of two or more wires which connect the indicating means at the tank with the gage at the dash-board in order that the electrical current may be properly transmitted to the gage to indicate the liquid level. In the present invention only a single wire is used to connect the operating unit at the tank with the gage at the instrument board and therefore a much simpler and less expensive electric circuit may be used.

The gage of the invention also has several novel features including a plurality of coils or electro-magnets one of which has a varying field. The variable field coil is provided with a pole piece in the form of a strip of iron. The object of the pole piece is to form an iron path for the magnetic lines of force, thereby decreasing the resistance and intensifying the field. The pole piece is secured at one of its ends to the coil and has its other end free and disposed adjacent the opposite end of the coil. Between the end of the pole piece and the coil there is pivotally mounted the shaft to which the armature and pointer are secured and the combined fields act on the armature to swing a pointer or index over a dial to indicate the liquid level in the tank.

The tank unit includes a resistance and a contact movable thereover, together with a float in the tank to operate the contact over the resistance. The position of the contact on the resistance will determine the amount of current which will pass through the variable coil of the gage and the degree of energization of this coil, and determine the position of the index or pointer on the dial.

On the drawing,

Fig. 1 is a schematic representation of the liquid level indicator.

Fig. 2 is a front view of the gage with a portion of the dial removed for purposes of clearer illustration.

Fig. 3 is a sectional view through the gage on the line 7—7 of Fig. 6.

Referring to the drawing the tank unit is indicated as a whole at T and the gage unit at G, while C designates the electric circuit.

Referring to Fig. 1 the tank unit T is secured in the upper portion of the usual fuel tank includes a member 4 and the cap or housing 14 provided with a removable cover (not shown). Secured to the upper end of the member 4 is the spring contact finger 22 the end of which is adapted to move over the arcuate resistance 26 secured inside the cap or housing 14. One end of the resistance 26 may optionally be grounded as at 28 while the other end 30 is electrically insulated from the housing by means of the connection 32 and is electrically connected to the wire 34 of the circuit C which leads to the gage G.

Referring to Figs. 2 and 3, the novel gage of the invention includes the casing 70 having the insulation 72 on the rear thereof and the insulation 74 on the inside. These two insulations are held onto the casing by means of terminals 76 and 78.

A base plate 80, provided with a plurality of upwardly projecting ears 82, 84, 86 and 88, is mounted on the insulation 74. On the ear 82 there is mounted the coil or electromagnet 90 and on the ear 84 there is mounted the coil or electromagnet 92. Secured between the ear 84 and the end of the bobbin of the electromagnet 92 is the end 96 of the iron pole piece 98 which is bent to the configuration shown and has its end 100 freely disposed and extending substantially opposite the core 102 of the electromagnet 92. The purpose or function of this pole piece is to provide an iron path for the magnetic lines of force between the poles of the electromagnet and accordingly considerably intensify the magnetic field about the electromagnet 92.

A shaft 104 is pivoted between the ear 86 and the base plate 80 and on this shaft there are rigidly mounted the armature 106 and the pointer 108, the latter having the counterweight 110. The shaft and armature are also positioned between the free end 100 of the pole piece 98 and the core 102 of the coil 92.

The ears 88 serve as a means to which the dial 112 is secured. The dial is provided with the usual slot 114 to allow the pointer to project upwardly thereover, and bent up triangular portions 116 serve as stops to limit the swing of the pointer.

A source of electric current is indicated conventionally at 118 and leading from this source is a wire 120 passing through the ignition switch 122 to the terminal 76 of the gage. A suitable conductor 124 connects the terminal 76 to the outermost end 126 of the coil 90, while the innermost end is electrically connected to the terminal 78 by means which will be later described, but which is conventionally indicated at 128 on Fig. 1. The windings of the coil 90 are such that the outer end will be a north pole and the inner end a south pole.

The outer end of the coil 92 is likewise connected to the terminal 78 by a means which will be later described but which is conventionally indicated at 130 in Fig. 1. The opposite end of the coil 92 is connected by means of a wire 132 to a contact at 134 which leads to ground as shown at 136.

The lead 34 from the tank unit T is also connected to the terminal 78 as is shown on Fig. 1.

By referring to Fig. 6, it will be noted that the bobbin of the electromagnet 92 comprises the core 102 and the end washers 138 and 140, the core having a reduced end to receive one of the washers. The core 102, washer 140, pole piece 98 and ear 84 are rigidly connected by means of the nut 142. Before winding the coils on the electro-magnets 90 and 92, a groove 144 is formed in their cores 102 and the end of the wire soldered in this groove. The first few turns of the wire are also not insulated so that a positive contact is obtained between the wire and core. This construction will form an electric connection with the base plate 80 and terminal 78,—the wires 128 and 130 shown in Fig. 1 not being used in actual practice.

The operation of the liquid level indicator is as follows: Assuming that the contact finger is in the position shown in Fig. 1, the current from the battery 118 will flow in the conductor 120 to the terminal 76, through the wire 124, and into the coils of the electro-magnet 90, forming a north pole at the outer end and a south pole at the inner end. The current in the battery will always flow through the electro-magnet 90 and give to this electromagnet a field of approximately constant intensity. From the electro-magnet 90 the current will flow to the terminal 78, where it will tend to divide between the wire or connection 34 and the connection 130. However, due to the fact that the contact finger 22 is at the extreme end of the resistance 26 the larger portion of the current will flow through the connection 130 and coil 92, and out at the connection 132, to ground 136, and give to the coil 92 its maximum intensity. This intensity because of the pole piece 98, will be considerably greater than the field intensity of the coil 90, and accordingly the armature 106 will be swung from its position parallel with the axis of the coil 90, through an angle corresponding to the shifting of the resultant field and move or swing the pointer 108 to the extreme right hand end of the scale to indicate tank full position, or the position corresponding to 56' of the float in Fig. 2.

Assuming now that the contact finger 22 is swung to the opposite end of the resistance 26, or at the connection 32, the flow of current will now be the same as before up to the terminal 78, but from this terminal the current will tend to follow the lines of least resistance and will accordingly flow through the wire 34, connection 32, contact finger 22 and wire 63 to ground. Only a negligible portion of the current flows through the coil 92 to ground 136 through the contact at 134. This will give to the coil 92 practically no energization and will permit the field of the coil 90, which is now the stronger, to draw the armature into parallelism with its core and swing the pointer to the extreme left hand end of the scale to indicate tank empty position.

With the contact finger 22 at the mid position of the resistance 26, as shown in the dotted outline in Fig. 1, the current passing through the coils 90 and 92 will be such that both coils have substantially the same degree of energization which will cause the armature to assume a position half way therebetween and move the pointer to indicate that the tank is half full.

The electrical connections and windings of the electro-magnet 92 are such that its outer end will form a north pole and its inner end a south pole. In other words the coil 92 will have a polarity which is the same as that of the coil 90.

The adjustment of the gage is accomplished by suitably bending the ears 82 or 84. After the coils are in place the contact finger 22 is swung to one extreme end and if the pointer is not at its corresponding extreme end of the scale, the ear is suitably bent to adjust the coil so that its field will bring the pointer to the proper position. The finger 22 is now swung to the opposite end of the resistance 26 and the second coil suitably adjusted by bending its ear so that the finger will be at the other extreme of the scale. The finger 22 is now placed at the mid portion of the resistance 26 and by appropriately bending both ears 82 and 84 the pointer may be made to assume the mid position.

I claim:

1. In an electrical indicating instrument, a plurality of coils, one of said coils having approximately a constant field and another coil having a variable field, an iron forming a path for the flux lines of said variable coil, said iron secured at one end to the coil and having its other end free and extending around to the opposite end of said coil, and an index pivotally mounted between the said free end and said variable coil and responsive to changes in the field strength of the coils.

2. In an electrical indicating instrument, a casing, a base plate mounted in said casing, ears on said plate, a plurality of coils mounted on said ears, a pointer mounted on a shaft pivoted between one of said ears and the base plate, and an iron secured at its end to one of said coils and having its opposite end free and extending around to the opposite end of said coil to form an iron path for the lines of force.

3. In an electrical indicating instrument, a plurality of electro-magnets, a pointer responsive to the energization of said magnets, and an iron path exterior to and in the field of one only of said coils.

4. In an electrical indicating instrument, a plurality of electro-magnets, a pointer responsive to the energization of said magnets, and an iron path exterior to and in the field of one only of said coils, said iron secured at one end to the coil and having its opposite end free and disposed adjacent the pivot of the pointer.

5. In an electrical indicating instrument, a base plate, a plurality of electro-magnets, an ear for each magnet on said base plate, said magnets secured to said ears, an iron pole piece secured at one end to and extending around one of said coils and spaced from said coil at its opposite end, and a pointer pivoted in said frame between said pole piece and magnet.

6. In an electrical indicating instrument having a pointer, two electromagnets having their centerlines radiating from a substantially common center, means responsive to the energization of said magnets for moving said pointer, and an iron flux concentrating member in the field of one only of said magnets.

7. In an electrical indicating instrument having a pointer, two electromagnets having their centerlines radiating from a substantially common center, means responsive to the energization of said magnets for moving said pointer, and an iron member secured to one end of one of said magnets and extending in the field of said magnet and around and spaced from the opposite end thereof.

8. In an electrical indicating instrument, a plurality of electromagnets having their centerlines radiating from a substantially common point, a pointer responsive to the energization of said magnets, and an iron member exterior to and in the field of one only of said magnets, said member secured at one end to the magnet and having its opposite end free and disposed adjacent the pivot of the pointer.

In testimony whereof I affix my signature.

ELBRIDGE F. BACON.